United States Patent [19]
Uehara

[11] Patent Number: 5,917,543
[45] Date of Patent: *Jun. 29, 1999

[54] VIDEO CONFERENCE SYSTEM AND CONTROL METHOD FOR THE SAME

[75] Inventor: Tsukasa Uehara, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/641,340

[22] Filed: May 1, 1996

Related U.S. Application Data

[63] Continuation of application No. 08/226,708, Apr. 12, 1994.

[30] Foreign Application Priority Data

Apr. 15, 1993 [JP] Japan ..................................... 5-088585

[51] Int. Cl.[6] .............................. H04N 5/232; H04N 7/14
[52] U.S. Cl. .............................. 348/214; 348/211; 348/15
[58] Field of Search ................................. 348/13, 14, 15, 348/16, 19, 142, 143, 159, 211, 214, 213; 318/640

[56] References Cited

U.S. PATENT DOCUMENTS

| | | | |
|---|---|---|---|
| 3,419,674 | 12/1968 | Burns et al. | 348/14 |
| 4,905,315 | 2/1990 | Solazi e tal. | 318/640 |
| 4,931,872 | 6/1990 | Stoddard et al. | 348/588 |
| 5,111,288 | 5/1992 | Blackshear | 348/143 |

FOREIGN PATENT DOCUMENTS 63-009287  1/1988  Japan ............................ H04N 5/232

*Primary Examiner*—Wendy Garber
*Assistant Examiner*—Andrew B. Christensen
*Attorney, Agent, or Firm*—Robin, Blecker & Daley

[57] ABSTRACT

A video conference system includes a detecting circuit for detecting an amount corresponding to a movement delay, if the movement delay occurs in a terminal device prepared at a second point when the terminal device is made to perform the movement, in accordance with an instruction sent from the first point, and a memory circuit for storing the amount corresponding to the movement delay detected by the detecting circuit. The device is made to move in a direction opposite to the direction in which the device has been made to move, on the basis of the amount stored in the memory circuit.

12 Claims, 10 Drawing Sheets

5,917,543

VIDEO CONFERENCE SYSTEM AND CONTROL METHOD FOR THE SAME

This is a continuation application under 37 CFR 1.62 of prior application Ser. No. 08/226,708 filed Apr. 12, 1994.

BACKGROUND OF THE INVENTION

1. Field of the Invention

The present invention relates to a method for controlling a participant-image camera or an original-image camera in a video conference system which enables a conference to be conducted between remotely located points.

2. Description of the Related Art

FIGS. 1 and 2 show one example of a general video conference system. FIG. 1 is a block diagram schematically showing the arrangement of a terminal apparatus, and FIG. 2 is a block diagram schematically showing the state in which terminal apparatuses, each of which is similar to that shown in FIG. 1, are installed in a conference room A and a conference room B, respectively. The conference room A serves as a station in which one conference participant himself is positioned (hereinafter referred to as "present station"), while the conference room B serves as a station in which another conference participant is positioned (hereinafter referred to as "remote station"), and the present station and the remote station are connected by a communication line.

In the terminal apparatus shown in FIG. 1, a participant-image camera 10 is provided for picking up an image of a conference participant. The participant-image camera 10 generally adopts an arrangement in which a camera part is disposed on a panhead part. The operation of the participant-image camera 10 in the direction of panning or tilting is controlled through remote control of the panhead part. A control circuit 11 performs control of the operations of the camera part of the participant-image camera 10, such as focusing, zooming and iris adjustment, or control of the panning or tilting operation of the panhead part. In FIG. 1, the participant-image camera 10 is shown as one block since the camera part and the panhead part are integrally assembled. However, it is also possible to adopt a participant-image camera of the type in which the camera part and the panhead part are separately provided.

An original-image camera 12 is provided for picking up an image of an original 16 placed on an original supporting base 14. A camera control circuit 18 is provided for controlling the operations of the original-image camera 12, such as focusing, zooming and iris adjustment. If the original-image camera 12 has a panhead function, the camera control circuit 18 also controls the panhead function. A monitor device 20 displays an image picked up by the participant-image camera 10 or the original-image camera 12, and also displays an image transmitted from a remote station. Although one monitor device is shown in FIG. 1, it is also possible to adopt a system provided with a plurality of monitor devices. An image control circuit 22 controls the transmission of an image picked up by the participant-image camera 10 or the original-image camera 12 and the display of such an image on the monitor device 20, as well as the display of a received image on the monitor device 20.

The arrangement shown in FIG. 1 also includes a microphone 24 for input of sound, a speaker 26 for output of sound, a sound control circuit 28 for controlling the transmission of an input sound supplied from the microphone 24 as well as the outputting of the input sound and a received sound signal to the speaker 26.

The shown arrangement also includes a communication control circuit 30 which is connected to a communication line for controlling the communication of images and sounds, a system control circuit 32 for controlling the entire system, and an operating device 34 having a keyboard, a digitizer or the like for inputting a predetermined instruction.

FIG. 2 is a block diagram schematically showing the state in which the terminal apparatuses, each of which is identical to that shown in FIG. 1, are respectively installed in the conference room A which serves as the present station and the conference room B which serves as the remote station, both terminal apparatus being connected by the communication line. In the illustration of the terminal apparatus installed in the conference room A which serves as the present station, individual blocks are denoted by reference numerals in which the characters "A" are respectively added after the corresponding reference numerals used in FIG. 1. In the illustration of the terminal apparatus installed in the conference room B which serves as the remote station, individual blocks are denoted by reference numerals in which the characters "B" are respectively added after the corresponding reference numerals used in FIG. 1.

In such a system, a person "a", who is in the conference room A serving as the present station, operates an operating device 34A to control a control circuit 11A, a camera control circuit 18A, an image control circuit 22A, a sound control circuit 28A, a communication control circuit 30A and other associated circuits. The person "a" also controls a control circuit 11B for a participant-image camera 10B provided in the remote station, so that a person "b" who is in the conference room B serving as the remote station can be displayed at an optimum location on a monitor device 20A. Similarly, the person "a" can also control a control circuit 18B for an original-image camera 12B provided in the remote station.

In the meantime, the person "b" operates an operating device 34B to control a control circuit 11B, a camera control circuit 18B, an image control circuit 22B, a sound control circuit 28B, a communication control circuit 30B and other associated circuits. The person "b" also controls the control circuit 11A for the participant-image camera 10A provided in the present station, so that the person "a" who is in the conference room A serving as the present station can be displayed at an optimum location on a monitor device 20B. Similarly, the person "b" can also control the control circuit 18A for the original-image camera 12A. Thus, the person "a" and the person "b" hold a video conference.

If a video conference is conducted by using the system shown in FIGS. 1 and 2, the participant-image camera 10 is operated in the following manner. If the person "a" controls the control circuit 11B, which is provided in the conference room B serving as the remote station, in order to display the person "b" at an optimum location on the monitor device 20A, or if, in a video conference held by a plurality of participants, the person "a" turns the participant-image camera 10B from a particular person to another person in the conference room B serving as the remote station and displays that person on the monitor device 20A, the motion of the participant-image camera 10B involves a time lag which corresponds to the required communication time or a delay which occurs in a power transmission system in the operating mechanism of the participant-image camera 10B. Such a time lag leads to the following problems.

(i) If the person "a" pans or tilts the participant-image camera 10B while viewing the monitor device 20A, a time lag occurs which corresponds to the required communication time or the delay occurring in the power transmission system. As a result, the person "a" moves the participant-image camera 10B by an excess amount corresponding to the time lag, so that a target person is displayed at a location which deviates from the optimum location on the monitor device 20A. If the person "a" moves the participant-image camera 10B in the opposite direction to correct the location at which the target person is displayed, the person "a" similarly moves the participant-image camera 10B by an excess amount in the opposite direction. Since it takes a long time to display the target person at the optimum location on the monitor device 20A, the person "a" has a remarkably uncomfortable sensation.

(ii) If the person "a" controls, while viewing the monitor 20A, the operation, such as focusing, zooming or iris adjustment, of the participant-image camera 10B provided in the remote station, it takes a long time to display an image controlled in an optimum state on the monitor device 20A.

(iii) If the person "a" controls not the participant-image camera 10B but the original-image camera 12B, similar problems occur.

SUMMARY OF THE INVENTION

An object of the present invention which has been made to solve the above-described problems is to provide a video conference system capable of easily and rapidly displaying a person located at a remote station, at an optimum position on a monitor, as well as a control method for the video conference system.

To achieve the above object, in accordance with one aspect of the present invention, there is provided a video conference system which enables a video conference to be conducted between a first point and a second point, which system comprises a terminal device prepared at the second point, an operating device prepared at the first point for instructing the terminal device to perform a movement, and controlling means for causing the terminal device to move by a second amount of driving smaller than a first amount of driving if it is necessary to cause the terminal device to move again within a predetermined time after the terminal device has been instructed to perform a predetermined movement by the first amount of driving by means of the operating device.

In the above-described system, after the device prepared at the second point has been made to perform the predetermined movement by the first amount of driving in accordance with an instruction sent from the first point, if it is necessary to cause the device to move again within a predetermined time, the device is made to move by the second amount of driving smaller than the first amount of driving, To achieve the above object, in accordance with another aspect of the present invention, there is provided a video conference system which enables a video conference to be conducted between a first point and a second point, which system comprises a terminal device prepared at the second point, an operating device prepared at the first point for instructing the terminal device to perform a movement, detecting means for detecting an amount corresponding to a movement delay if the movement delay occurs in the terminal device when the terminal device is made to perform the movement in accordance with an instruction sent from the operating device, memory means for storing the amount corresponding to the movement delay detected by the detecting means, and controlling means for causing the terminal device to move in a direction opposite to a direction in which the terminal device has been made to move, on the basis of the amount stored in the memory means.

In the above-described system, if an instruction to cause the device prepared at the second point to perform a movement is sent from the first point to the second point, after the movement has been performed, the device is made to move in a direction opposite to the direction in which the device has been made to move, on the basis of the stored amount.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Embodiments of the present invention will be described below in detail with reference to the accompanying drawings. The system control circuit 32 and associated parts which are used in the present embodiments are different from those used in the related art.

<First Embodiment>

Figure 1:
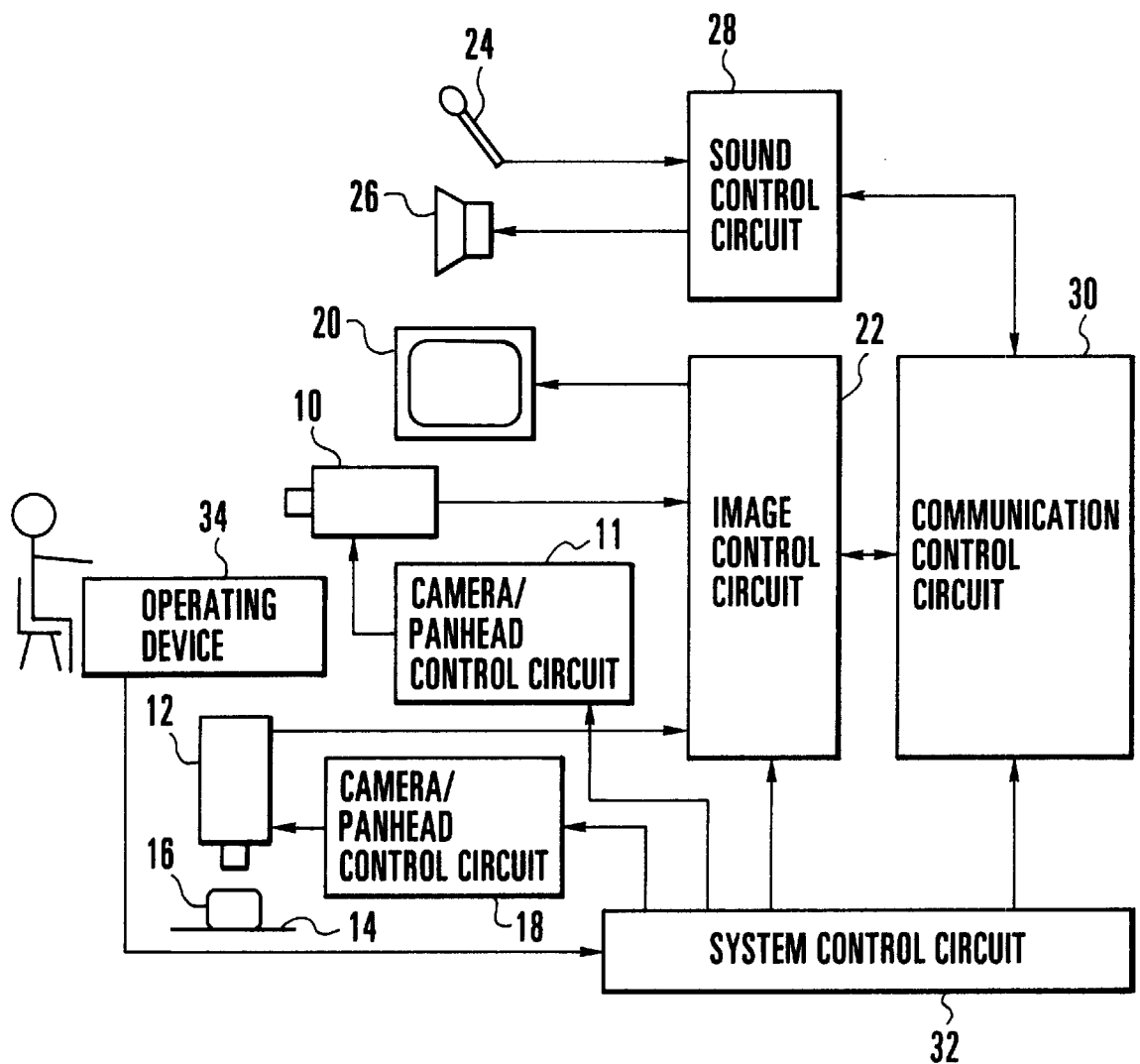
FIG. 1 is a block diagram schematically showing the arrangement of a general video conference system.
Figure 2:
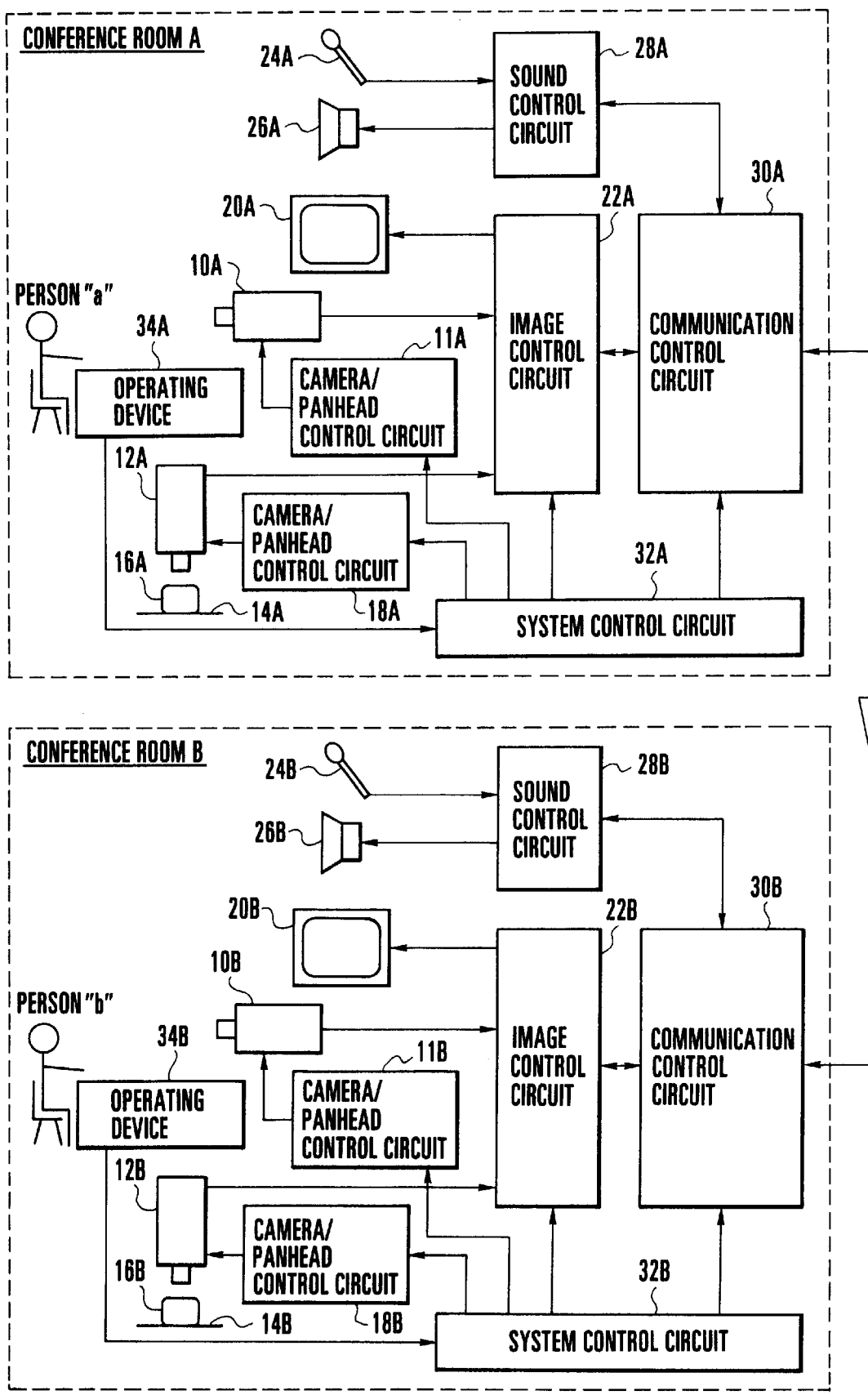
FIG. 2 is a block diagram schematically showing a state in which video conference systems such as that shown in FIG. 1 are respectively installed in a conference room A which serves as a present station and in a conference room B which serves as a remote station, the video conference systems being connected by a communication line.
Figure 3:
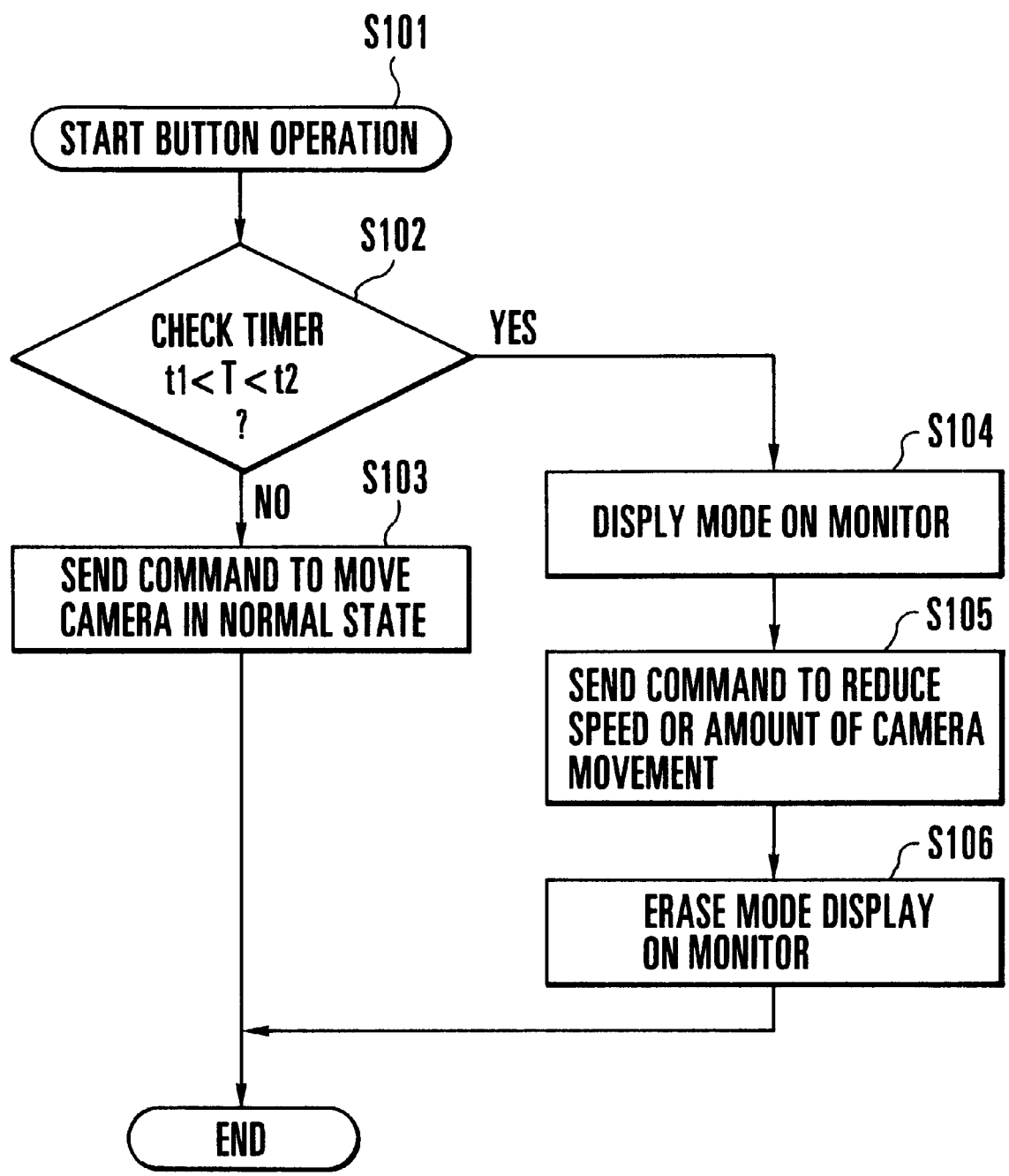
FIG. 3 is a flowchart showing the operation of a first embodiment of the present invention.

FIG. 3 is a flowchart showing one embodiment of the present invention. In the description of the first embodiment, reference will be made to a case where the operation of panning a participant-image camera 10B in a conference room B which serves as a remote station is controlled in a conference room A which serves as a present station, in an arrangement such as that shown in FIG. 2.

Figure 4:
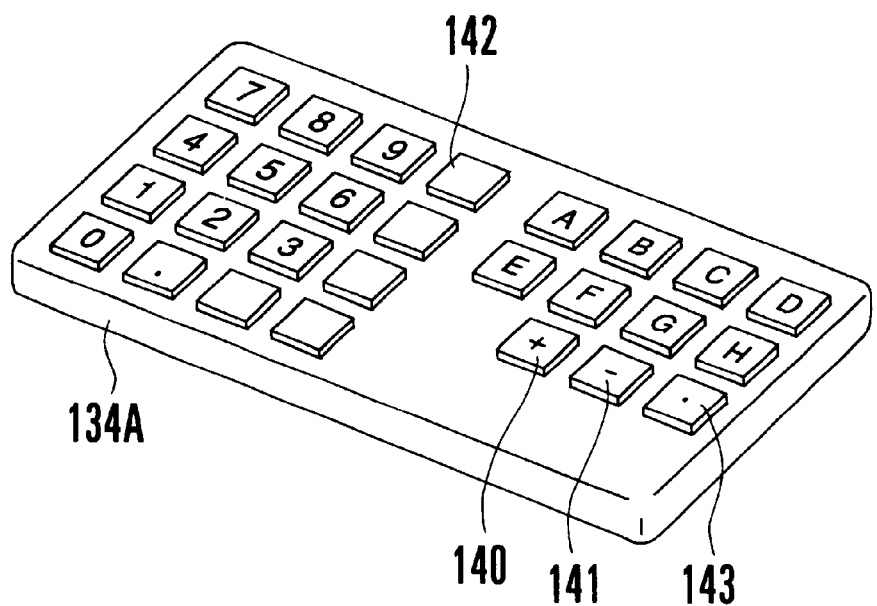
FIG. 4 is a schematic view showing an operating device suitable for use in each embodiment of the present invention.
Figure 5:
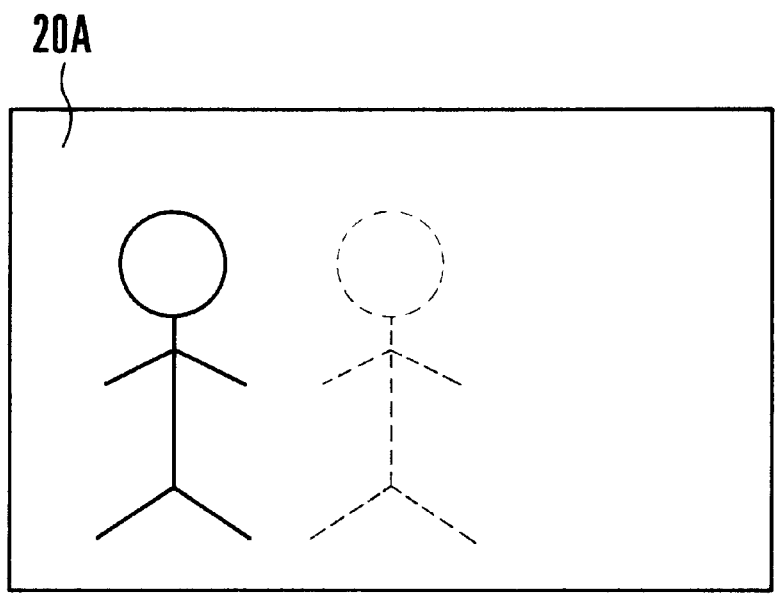
FIG. 5 is a schematic view showing a picture displayed on a monitor according to each embodiment of the present invention.

First, in Step S101, a person "a" operates an operating button (not shown) provided on an operating device 34A having a keyboard, a digitizer or the like, thereby inputting an instruction to execute an operation. More specifically, if the person "a" depresses a device selecting switch "A" on the an operating device 134A the essential portion of which is schematically shown in FIG. 4, an instruction to start the operation of the participant-image camera 10B is inputted. If the person "a" depresses a "+" direction operation button 140, the participant-image camera 10B can be made to move in the "+" direction. At this time, if it is necessary to move the participant-image camera 10B by a large amount, the person "a" continues to depress the button 140, whereby a signal is transmitted to a control circuit 11B so that the participant-image camera 10B continuously performs a panning operation. Then, if the person "a", while viewing a monitor device 20A, determines that the participant-image camera 10B has reached a position which appears to be appropriate, for example, a position where the person shown by dashed lines in FIG. 5 is displayed, the person "a" stops operating the button 140 (this point in time is referred to as "time instant p"). However, even after the person "a" stops operating the button 140, the participant-image camera 10B continues to be driven by a time period which corresponds to the required communication time or the time required for image compression as well as by a time period which corresponds to a delay occurring in a power transmission system in the participant-image camera 10B. As a result, a position where the participant-image camera 10B actually stops deviates from the position where the person "a" has intended to stop the participant-image camera 10B. Since an image obtained at this deviated position (the person shown by solid lines in FIG. 5) is displayed on the monitor device 20A, the person "a" again operates the operating device 134A for the purpose of correcting such a deviation (this point in point is referred to as "time instant q"). In this case, the person "a" operates a button 141 (refer to FIG. 4) for the purpose of causing the participant-image camera 10B to move in the opposite direction. If a time period which elapses after the person "a" has stopped operating the button 140 is indicated by T, the elapsed time T is represented as:

$$T=q-p$$

This elapsed time T is found in the following manner. The point in time at which the person "a" stops a button operation is set to T=0 and a timer starts its counting operation. The counting operation is performed in accordance with a timer interrupt routine which will be described later with reference to FIG. 6. At the time when the next button operation is performed, the timer is brought to a stop, and the elapsed time T is calculated.

Then, in Step S102, the timer is checked as to whether the elapsed time T is between a first time t1 and a second time t2. The first time t1 indicates that the time interval during which the person "a" continues to press a button to continuously move the participant-image camera 10B, or the time interval determined by adding a certain constant amount to the aforesaid time interval. The second time ts indicates the time interval from which it can be determined that a sufficient time has elapsed since the end of the button operation. Specifically, in Step S102, a check is made as to whether the button operation is continuing (whether the participant-image camera 10B is being continuously driven: $T \leq t1$), or a check is made as to whether a sufficient time period has elapsed since the end of the button operation ($t2 \leq T$). If the answer of either of the checks is "YES", the process proceeds to Step S103. If both of the answers are "NO" (t1<T<t2), it is determined that the deviation of the participant-image camera 10B is being corrected, the process proceeds to Step S104.

In Step S103, the speed at which the participant-image camera 10B is made to move in its normal state (a first speed of camera movement) or the amount by which the participant-image camera 10B is made to move in the normal state (a first amount of camera movement) is specified.

In Step S104, the state of an operation to be actually executed in the next step S105 is displayed. Specifically, if the speed of camera movement is in a reduced state or the amount of camera movement is decreased, the state of the corresponding mode is displayed on the monitor device 20A, whereby the operator "a" is informed that such a mode is selected. This mode display can be achieved by using, for example, characters or numbers (indicative of the values of the reduced speed and decreased amount of camera movement, etc.), or other symbols or the like.

In Step S105, an instruction is issued so that the speed of camera movement can be reduced (a second speed of camera movement) or the amount of camera movement can be decreased (a second amount of camera movement), with respect to the speed or amount of camera movement in the normal state. Incidentally, the reduction of the speed of camera movement can be achieved by decreasing the drive voltage or current of a drive motor for a panhead part, while the decrease of the amount of camera movement can be achieved by controlling the time period during which a drive force is applied. In the mode executed in Step S105, the participant-image camera 10B is located at a predetermined position. The state of the mode is displayed on the monitor device 20A.

In Step S106, when the participant-image camera 10B is located at the predetermined position and the above-described operation is completed, the display of the state of the mode on the monitor device 20A is cancelled, i.e., the display is erased.

Although the above description has referred to the case where the participant-image camera 10B has moved past a target position, the aforesaid reduced-speed mode can also be set by the operator "a" temporarily stopping operating the button 140, immediately before the participant-image camera 10B reaches the target position, and pressing again, within a predetermined time, the button 140 indicative of the same direction of camera movement.

Figure 6:
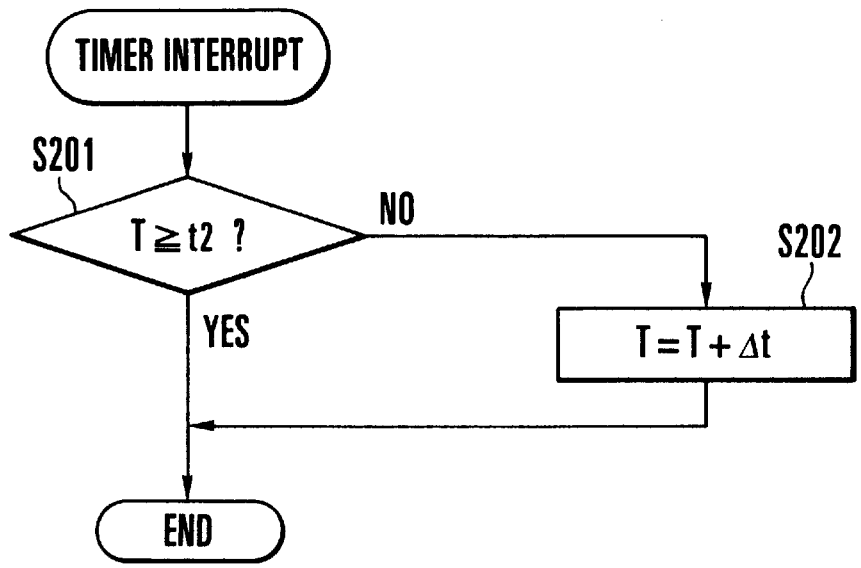
FIG. 6 is a flowchart showing one example of a timer interrupt according to the first embodiment.

FIG. 6 is a flowchart showing a timer interrupt for the embodiment shown in FIG. 3. The timer interrupt is performed by an output signal which is provided each time a timer which is set to a predetermined time completes counting the predetermined time.

Referring to FIG. 6, in Step S201, it is determined whether an elapsed time T after the completion of the previous button operation has reached a time t2. If T<t2, a small time Δt is added to the elapsed time T in Step S202. The small time Δt corresponds to the predetermined time set in the timer. With this method, it is possible to measure a long time by using a timer in which a short time can only be set.

It is to be noted that the present embodiment is arranged in such a manner that the value of the reduced speed of camera movement, the value of the decreased amount of camera movement or the like can be inputted (rewritable) from an operating device 34. This is because the distance between the conference room A and the conference room B is not necessarily constant and, therefore, the required communication time varies with the variation of the distance, with the result that it is necessary to modify the aforesaid values each time the required communication time varies. These values are stored in a memory (not shown) in the system control circuit 32, and in a video conference held between specific points, the respective cameras are always controlled on the basis of the same values. The memory is also capable of individually storing (a plurality of) values which correspond to various forms of video conferences, such as video conferences held between the conference room A and the conference room B, between the conference room A and a conference room C, between the conference room A and a conference room D, . . . , and so on. Accordingly, if a video conference with a remote conference room is held, a camera in the remote conference room can be controlled on the basis of the required value which corresponds to the location of the remote conference room. Although it is desirable that the above-described system control be performed by a system control circuit 32B (on the side where the participant-image camera 10B is disposed), the system control may also be performed by a system control circuit 32A on the side on which an instruction is issued.

Figure 7:
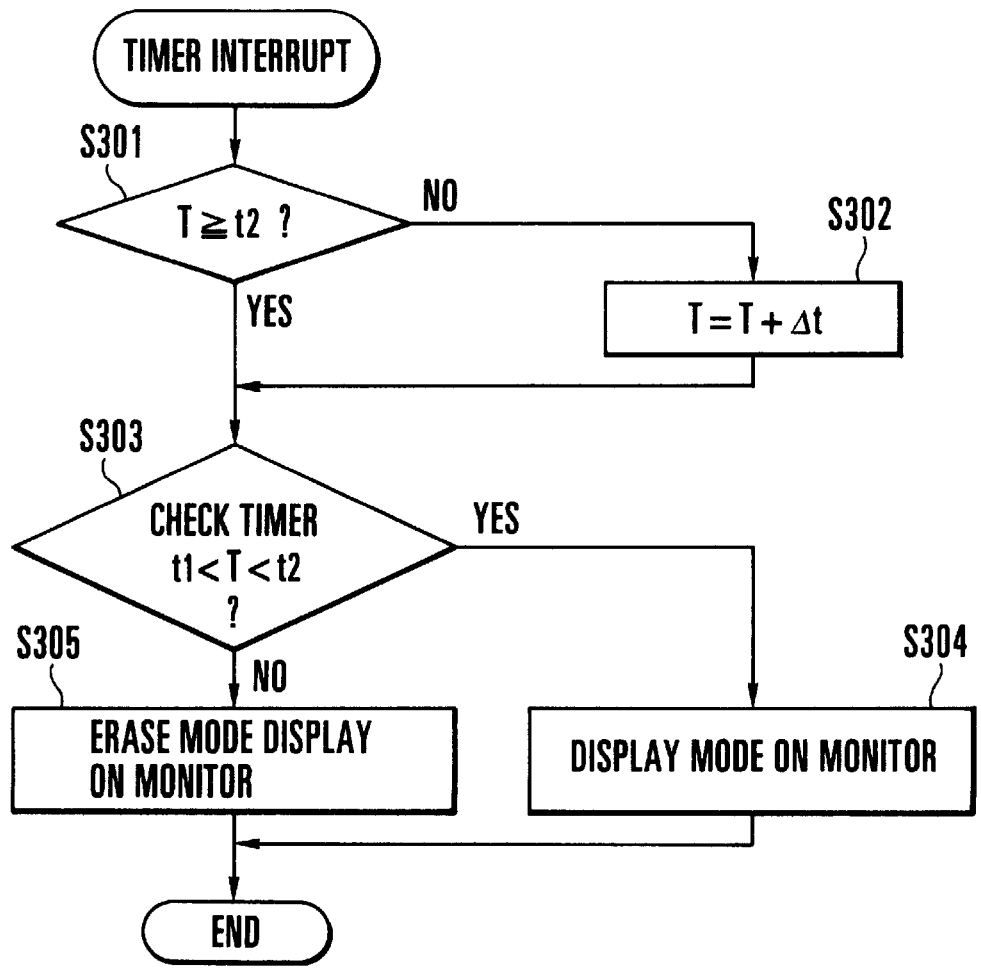
FIG. 7 is a flowchart showing another example of the timer interrupt.

FIG. 7 is a flowchart showing another example of the timer interrupt.

In the example shown in FIG. 7, a mode displaying operation and a displayed mode erasing operation are performed in the flow of the timer interrupt. For this reason, if the flow shown in FIG. 7 is adopted, Steps S104 and S106 in the flow shown in FIG. 3 are not needed.

Referring to FIG. 7, it is determined in Step S301 whether the elapsed time T after the end of the previous button operation has reached a time t2. If T<t2, the small time Δt is added to the elapsed time T in Step S302. On the other hand, if T≧t2, a decision is made as to t1<T<t2 in Step S303. If the elapsed time T satisfies this condition, the process proceeds to Step S304, in which the monitor is made to display the state in which the speed of camera (panhead) movement is in the reduced state or the amount of camera (panhead) movement is decreased, whereby an operator is informed that the corresponding mode is selected. If t1<T<t2 is not satisfied, the process proceeds to Step S305, in which this mode is cancelled.

Although in the above description of the first embodiment reference has been made to the manner of control of the participant-image camera, other controllable devices can, of course, be controlled in a similar manner. For example, if an arrangement in which a microphone in another station can be controlled in the present station is adopted, it is possible to achieve advantages and effects similar to the above-described ones by controlling the microphone in the above-described manner. Further, the first embodiment can also be applied to the operation of controlling a device provided in the present station to cope with a delay which occurs in the power transmission system of the device.

<Second Embodiment>

In a second embodiment, to solve the problems described previously, after the movement of a camera in a remote station has been stopped, the camera is controlled to return by a predetermined amount in the direction opposite to the direction in which the camera has moved before it stops. Simultaneously, since the required amount of the return movement varies among the distances to individual remote stations participating in a video conference, a value corresponding to an optimum amount of movement can be inputted by using an operating device.

Figure 8:
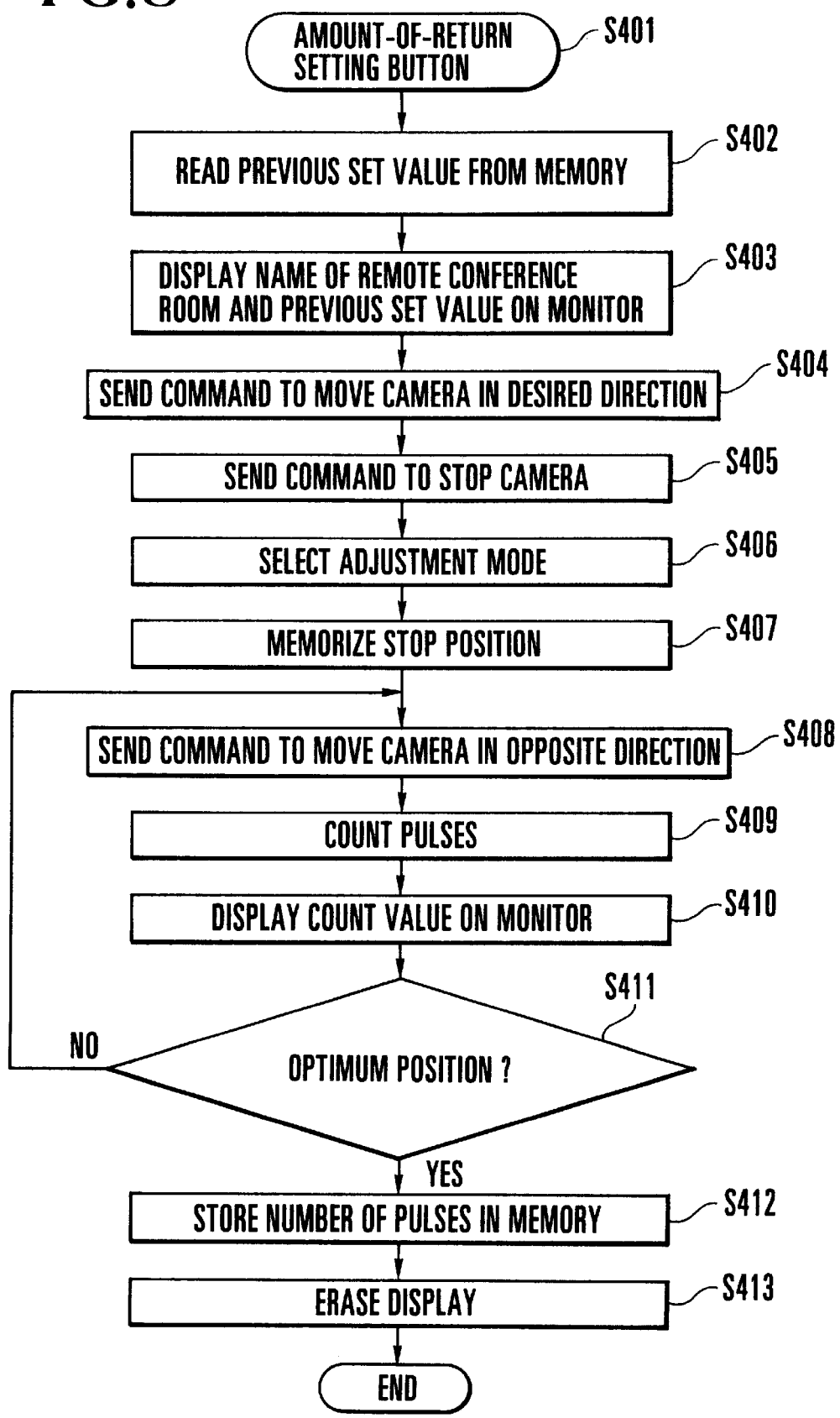
FIG. 8 is a flowchart aiding in explaining the manner in which the amount of return of a camera is set according to a second embodiment.

A second embodiment of the present invention will be described below. FIG. 8 is a flowchart showing the operation of the second embodiment. The second embodiment will be described below with reference to the case where, in an arrangement similar to that shown in FIG. 2, the person "a" whose is located in the conference room A serving as the present station executes the operation of panning the participant-image camera 10B which is provided in the conference room B serving as the remote station. If the first video conference using the conference room A and the conference room B is to be held, the person "a" starts by inputting from the operating device 34A a value which corresponds to the above-described amount of return of the participant-image camera 10B. The operation which is started in this manner will be described below with reference to the flowchart of FIG. 8. Incidentally, in the present system, the driving of a panhead is performed by means of a combination of a DC motor and an optical encoder, such as those shown in FIGS. 9 to 11, which were disclosed in U.S. patent application Ser. No. 938,425 filed on Aug. 31, 1992 (corresponding to Japanese Patent Application No. Hei 04-178392), and various kinds of control can be performed by counting the number of pulses. The combination of the DC motor and the optical encoder can be replaced with a pulse motor.

The functions of the participant-image camera 10 (317) and the panhead will be described below with reference to FIGS. 9 to 11.

Figure 9:
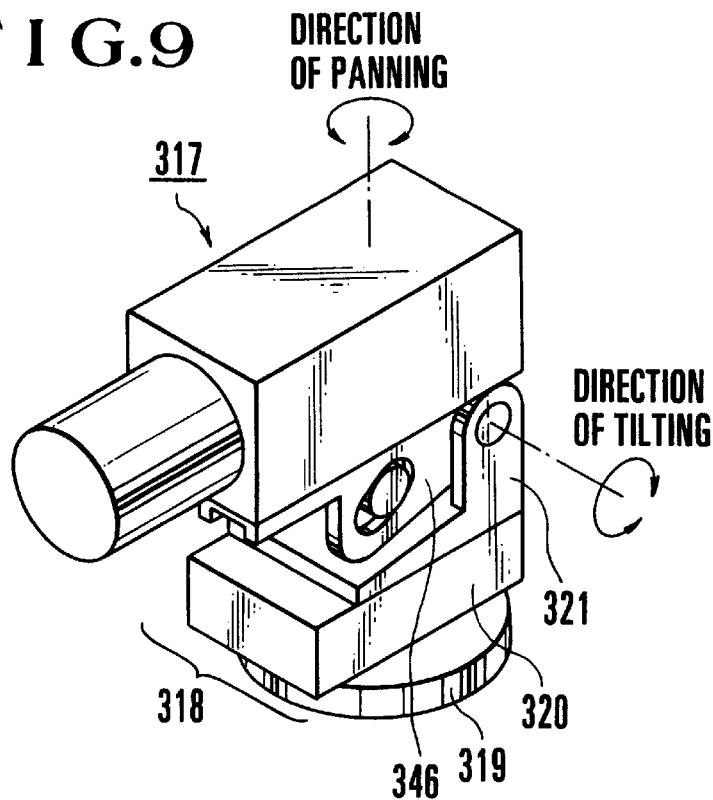
FIG. 9 is a schematic view showing a camera and a panhead which are used for picking up an image of a person.

FIG. 9 shows a camera which is used in a video conference for photographing a participant. A camera 317 is supported on a panhead 318 for turning motion in the horizontal and vertical directions, and is operated in the direction of panning or tilting in accordance with a control signal transmitted from the system control circuit 32B (FIG. 2) disposed in the video conference system. To realize this operation, the panhead 318 comprises a base 319 for supporting all the elements placed thereon, a panning member 320 rotatably supported on the base 319, a tilting member 321 mounted on the top surface of the panning member 320, and a camera mounting plate 346 rotatably mounted on the tilting member 321. The camera 317 is fixed to the camera mounting plate 346.

Figure 10:
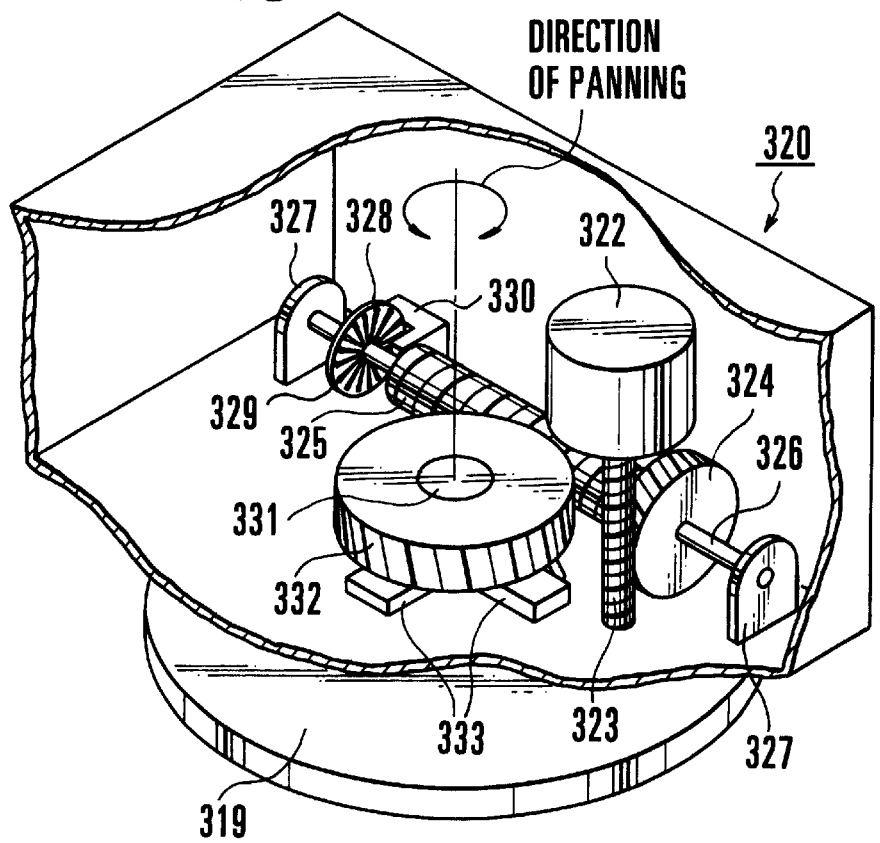
FIG. 10 is a schematic view showing a panning member for causing the panhead to perform a panning movement.
Figure 11:
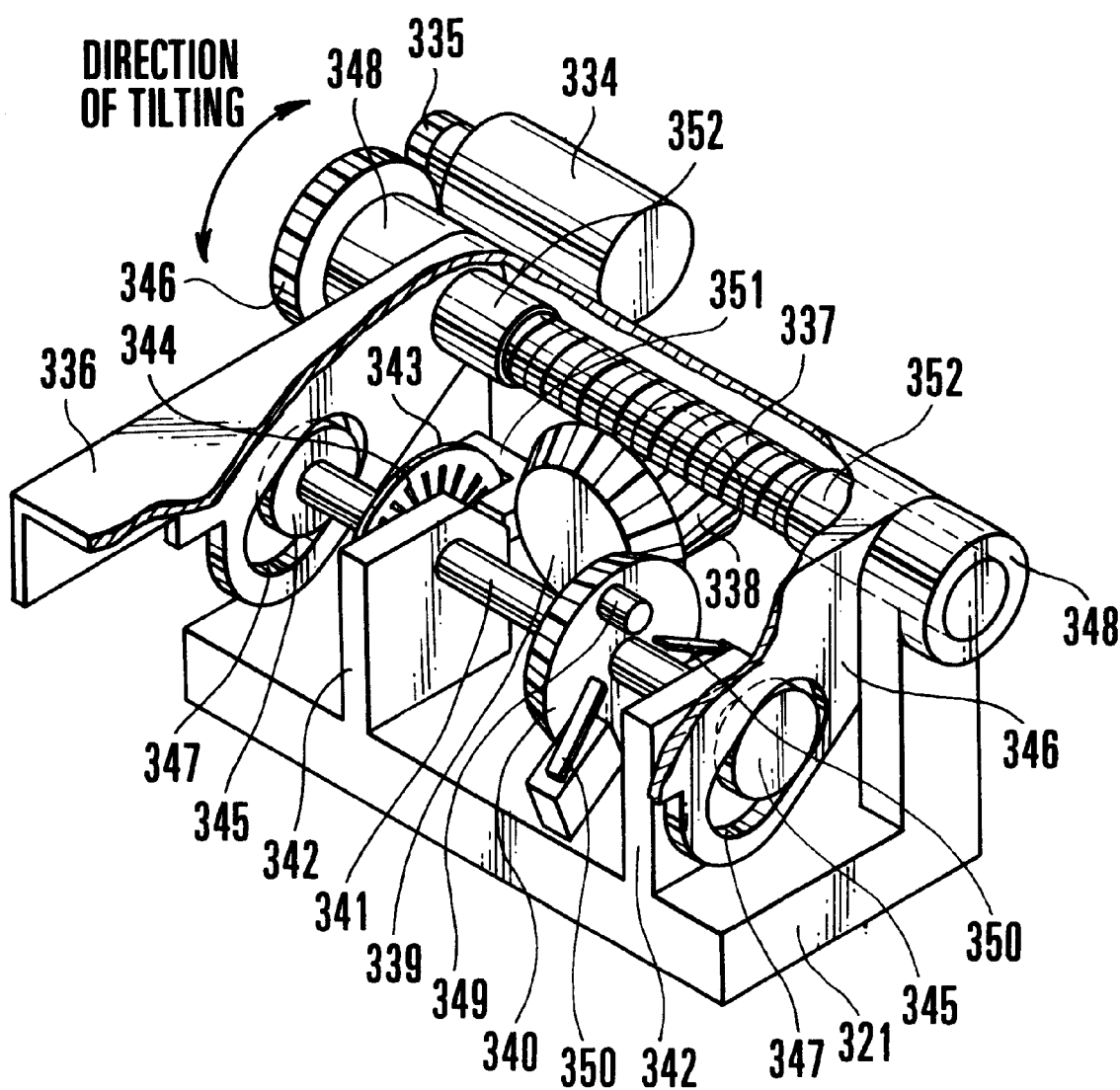
FIG. 11 is a schematic view showing a tilting member for causing the panhead to perform a tilting movement.

FIG. 10 is a schematic view showing the structure of the panning member 320 for causing the panhead 318 of FIG. 9 to perform a panning operation, and FIG. 11 is a schematic view showing the structure of the tilting member 321 for causing the panhead 318 to perform a tilting operation.

The panning member 320 shown in FIG. 10 includes a motor 322, a worm gear 323 press-fitted onto a spindle (not shown) of the motor 322, a helical gear 324 engaged with the worm gear 323, a worm gear 325 rotatable integrally with the helical gear 324, a rotating shaft 326 integrally combined with the helical gear 324 and the worm gear 325, bearings 327 for the rotating shaft 326, a disk 328 rotatable integrally with the rotating shaft 326 and provided with a multiplicity of slits 329, and a transmission type of photointerruptor 330. During the rotation of the disk 328, the slits 329 crosswise pass through the optical path of light transmitted from the photointerruptor 330, whereby transmission and interception of the light are successively repeated. The photointerruptor 330 detects a signal thus generated and transmits it to a counter (not shown). The panning member 320 also includes a shaft 331 uprightly mounted on the base 319, and a helical gear 332 engaged with the worm gear 325 and fixed to the shaft 331. The base 319, the shaft 331 and the helical gear 332 are integrally assembled. If the panning member 320 turns in the direction of panning as will be described later, a cam pin (not shown), which perpendicularly projects from the bottom surface of the helical gear 332 in the downward direction, actuates microswitches 333. The operational limit positions between which the panning member 320 is allowed to turn in the direction of panning are detected through the actuation of the respective microswitches 333. These microswitches 333 can also be used to set the initial position of the panning member 320.

In the above-described arrangement, when the motor 322 is driven in accordance with a control signal supplied from the system control circuit 32B through the panhead control circuit 11B, the rotational force of the motor 322 is transmitted along a gear train made up of the worm gear 323, the helical gear 324, the worm gear 325, and the helical gear 332. The helical gear 332 is immovable because it is assembled integrally with the base 319, so that the panning member 320 turns about the axis of the helical gear 332. In this operation, the cam pin (not shown) actuates the microswitches 333 so that the initial position and the operational limit positions of the panning member 320 can be detected. In addition, the angle of rotation of the panning member 320 can be detected from a signal (pulse signal) transmitted from the photointerruptor 330, whereby it is possible to practice control of the angle of rotation of the panning member 320 on the basis of information indicative of the detected angle of rotation.

FIG. 11 is a schematic view showing the structure of the tilting member 321 which is mounted on the panning member 320 in the above-described manner.

The arrangement shown in FIG. 11 includes a motor 334, a spur gear 335 press-fitted onto a spindle (not shown) of the motor 334, a spur gear 336 engaged with the spur gear 335, and a worm gear 337 rotatable integrally with the spur gear 336. The worm gear 337 is rotatably supported at its opposite ends by bearing portions 348 of the tilting member 321. The shown arrangement also includes a helical gear 338 engaged with the worm gear 337, a bevel gear 339 rotatable integrally with the helical gear 338, and a bevel gear 340 engaged with the bevel gear 339 and provided with a cam pin 349, which axially projects from one side of the bevel gear 340. The cam pin 349 is disposed to selectively actuate microswitches 350 when the bevel gear 340 rotates. This arrangement makes it possible to detect the initial position or the operational limit positions of the tilting operation of the camera mounting plate 346 (to be described later) on which the camera 317 (FIG. 9) is mounted. The shown arrangement also includes a shaft 341 rotatable integrally with the bevel gear 340, bearings 342 disposed on the tilting member 321 for rotatably supporting the shaft 341, and a disk 343 rotatable integrally with the shaft 341 and provided with a multiplicity of slits 344, and a transmission type of photo-interruptor 351. During the rotation of the disk 343, the slits 344 crosswise pass through the optical path of light transmitted from the photointerruptor 351, whereby transmission and interception of the light are successively repeated. The photointerruptor 351 detects a signal thus generated and transmits it to a counter (not shown). Elliptic cams 345 are fixed to the opposite ends of the shaft 341, respectively. The elliptic cams 345 are engaged with associated cam openings 347 formed in the camera mounting plate 346. Shafts 352 turnably support the camera mounting plate 346.

In the above-described arrangement, when the motor 334 is driven in accordance with a control signal supplied from the system control circuit 32B through the panhead control circuit 11B, the rotational force of the motor 334 is transmitted along a gear train made up of the spur gear 335, the spur gear 336, the worm gear 337, the helical gear 338, the bevel gear 339, the bevel gear 340, the shaft 341 and the elliptic cams 345. Since the elliptic cams 345 are engaged with the respective cam openings 347, the camera mounting plate 346 turns about the shafts 352 in the direction of tilting by the turn of the elliptic cams 345. In this operation, the initial position and the operational limit positions of the camera mounting plate 346 can be detected through the microswitches 350. In addition, the angle of rotation of the camera mounting plate 346 can be detected from a signal transmitted from the photointerruptor 351, whereby it is possible to practice control of the angle of rotation of the camera mounting plate 346 on the basis of information indicative of the detected angle of rotation.

The operation of the second embodiment using the above-described camera will be described below with reference to FIG. 8.

In Step S401, the person "a" presses an amount-of-return setting button 142 of the operating device 134A shown in FIG. 4. Then, in Step S402, the system control circuit 32A reads the value of the previously set amount of return from a memory (not shown) connected to the system control circuit 32A. In Step S403, this value and the name of a remote conference room (the conference room B, in the second embodiment) are displayed on the monitor device 20A via the image control circuit 22A. Initials, symbols, numbers or the like may also be displayed since it is only necessary to identify each remote conference room. Incidentally, in the case of the first setting, since there is no previous setting, "0" which is an initial value is displayed on the monitor device 20A.

In Step S404, if the person "a" presses a button indicative of the desired direction of camera movement (in this case, the "+" direction operation button 140), a camera moving command is sent to the system control circuit 32A, and the system control circuit 32A sends the camera moving command to the conference room B through a communication control circuit 30A. The system control circuit 32B interprets the command sent through the communication control circuit 30B, and instructs the camera/panhead control circuit 11B to drive the participant-image camera 10B in the "+" direction of panning.

In Step S405, while viewing the monitor device 20A, the person "a" presses a stop button 143 of the operating device 134A when the person "b" in the remote station is displayed at an optimum position, thereby sending a stop command. Thus, in Step S406, the system control circuit 32A is set to an adjustment mode, and, in Step S407, sends a command to reset the pulse value of a stop position to "0". This command is sent from the system control circuit 32A to the system control circuit 32B through the communication control circuit 30A and the communication control circuit 30B. The system control circuit 32B supplies an instruction indicated by the command to the camera/panhead control circuit 11B, thereby resetting the value of a pulse counter (not shown) of the camera/panhead control circuit 11B to "0". As described previously, even after the button operation has been stopped, the participant-image camera 10B continues to be driven owing to various factors such as the communication time required for the stop command to reach the camera/panhead control circuit 11B, the time required for image compression, and inertia which is derived from the mechanical structure of the participant-image camera 10B. Accordingly, a position (shown by solid lines) where the participant-image camera 10B actually stops deviates from the position (shown by dashed lines) where the person "a" has intended to stop the participant-image camera 10B, as shown in FIG. 5. As a result, the person "b" is displayed at a deviated position on the monitor device 20A.

Then, in Step S408, the person "a" operates the button 141 of the operating device 134A to send a command to drive the participant-image camera 10B in the opposite direction (the "−" direction). Simultaneously, in Step S409, a pulse counting command is also sent. Thus, in Step S410, the camera/panhead control circuit 11B is made to move in the opposite direction, whereby the person "b" is displayed on the monitor device 20A at a corrected position different from the deviated position. Simultaneously, the number of pulses generated with the movement of the participant-image camera 10B is counted, and the count value is sent from the system control circuit 32B to the system control circuit 32A provided in the conference room A. The count value is also displayed on the monitor device 20A via the image control circuit 22A.

In Step S411, the system control circuit 32A waits for the person "a" to confirm the state of the displayed image. The person "a" confirms the image displayed on the monitor device 20A and determines whether the position of the person "b" displayed on the monitor device 20A is an optimum position. If no optimum position has yet been reached, the process returns to Step S408, in which the person "a" operates the operating device 134A to again send a camera moving command. In response to this camera moving command, the participant-image camera 10B is again driven and pulses are again generated. Incidentally, the direction of camera movement may be either of the "+" and "−" directions so that the person "b" can be displayed at the optimum position on the monitor device 20A. The camera/panhead control circuit 11B adds the present pulse count value to the previous pulse count value, and sends the resultant count value to the system control circuit 32A.

In the above-described adjustment step, if the method described previously in connection with the first embodiment is employed, it is possible to easily set the participant-image camera 10B at the optimum position.

If it is determined in Step S411 that the camera/panhead control circuit 11B finally has reached the optimum position, the process proceeds to Step S412, in which the person "a" operates the operating device 134A and the count value obtained at this time is sent to and stored in the memory through the system control circuit 32A. After that, in Step S413, the name of the remote conference room, the initial value and the count value which are displayed on the monitor device 20A are erased. By executing the above-described operation, it is possible to set the amount of return, i.e., a correction value.

Incidentally, the correction value may be stored not in the memory connected to or built in the system control circuit 32A but in a memory provided on the side of the system control circuit 32B. The correction value may also be stored in both memories.

Figure 12:
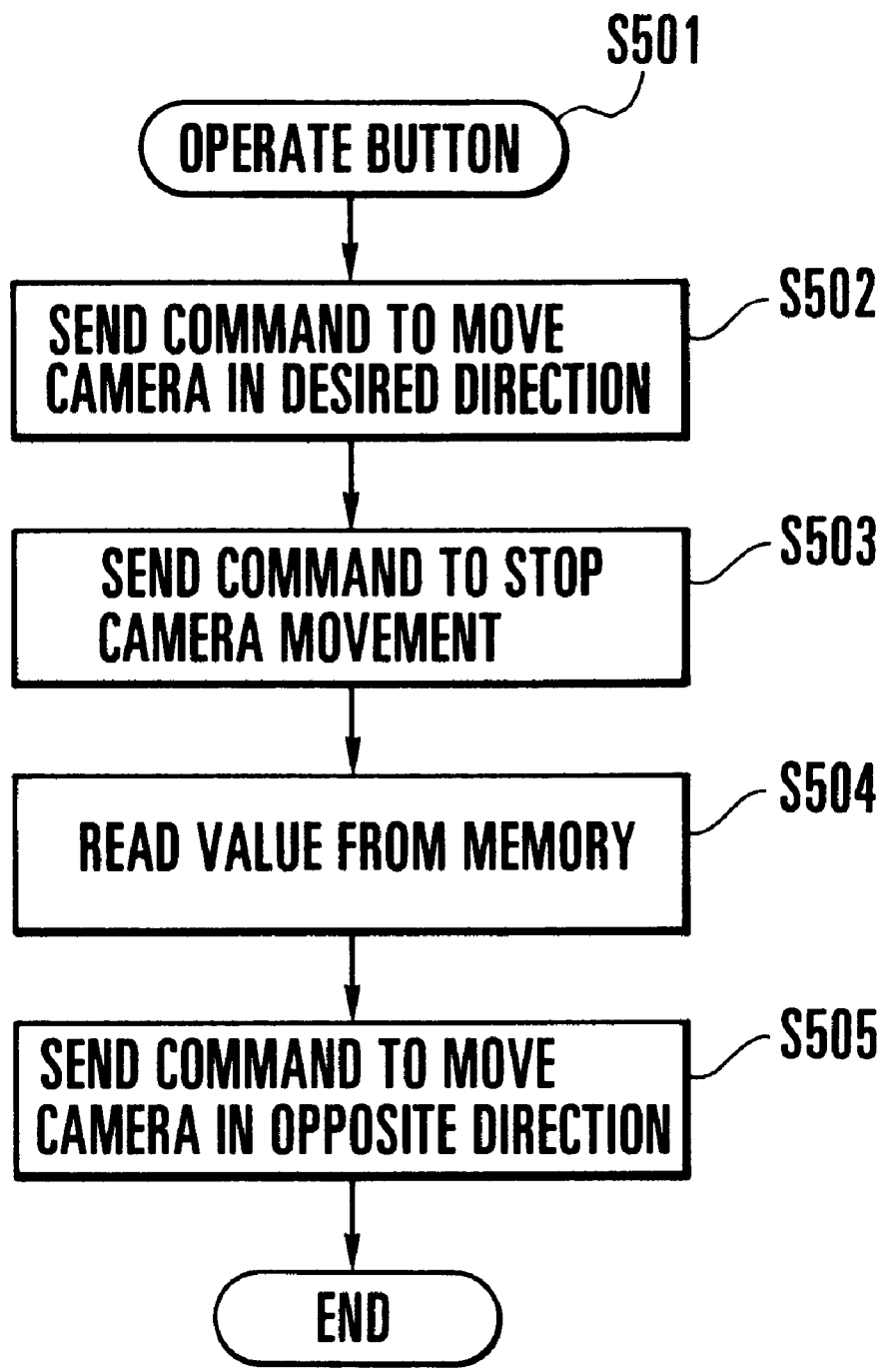
FIG. 12 is a flowchart aiding in explaining camera control according to the second embodiment.

After that, the person "a" and the person "b" have a video conference by performing a normal operation. FIG. 12 is a flowchart showing camera control which is performed during the video conference.

If the person "a" desires to move the participant-image camera 10B in the direction of panning, the person "a" presses the operation button 140 of the operating device 134A in Step S501. In Step S502, a camera moving command is sent to the system control circuit 32A, and the system control circuit 32A sends the camera moving command to the conference room B through the communication control circuit 30A. The system control circuit 32B interprets the command sent through the communication control circuit 30B, and instructs the camera/panhead control circuit 11B to drive the participant-image camera 10B in a selected direction of panning.

Then, in Step S503, when a desired image is displayed on the monitor device 20A, the person "a" presses the stop button 143 of the operating device 134A to send a stop command.

Then, in Step S504, the system control circuit 32B reads the set number of pulses and the set direction of camera movement (generally, the opposite direction) from the memory connected to the system control circuit 32A. In Step S505, a command to move the camera participant-image camera 10B in the opposite direction is sent on the basis of the read value, thereby driving the participant-image camera 10B. In consequence, the participant-image camera 10B can be finally stopped at an optimum position, whereby an image of the desired participant in the conference room B can be displayed at an optimum position on the monitor device 20A.

Although the above description has referred to the operation of panning the participant-image camera 10B, tilting, focusing, zooming, iris adjustment and the like can also be controlled in a similar manner. Although the second embodiment adopts the arrangement in which the number of pulses is counted, if another arrangement is adopted in which other factors, such as angle and time, can be controlled, the controlled values of these factors are stored in a memory, whereby an image of a desired participant in the conference room B can be displayed at an optimum position on the monitor device 20A. Although in the second embodiment the amount of camera movement in the opposite direction is stored in the memory, the value of this amount (correction value) may also be stored in a memory (not shown) connected to the system control circuit 32B, and if a stop command reaches the remote station, the correction value is read from the memory at that time and the participant-image camera 10B may also be controlled in accordance with the correction value.

Although the above description has referred to the video conference held between the conference room A and the conference room B, the memory is capable of individually storing (a plurality of) values which correspond to various forms of video conferences, such as video conferences held between the conference room A and the conference room B, between the conference room A and the conference room C, between the conference room A and the conference room D, . . . , and so on. Accordingly, if a video conference with a remote conference room is held, a camera in the remote conference room can be controlled on the basis of the required value which corresponds to the location of the remote conference room.

Although in the above description of the second embodiment reference has been made to the manner of control of only the participant-image camera, other controllable devices can be controlled in a similar manner. For example, if an arrangement in which a microphone in another station can be controlled in the present station is adopted, it is possible to achieve advantages and effects similar to the above-described ones by controlling the microphone in the above-described manner.

<Third Embodiment>

Figure 13:
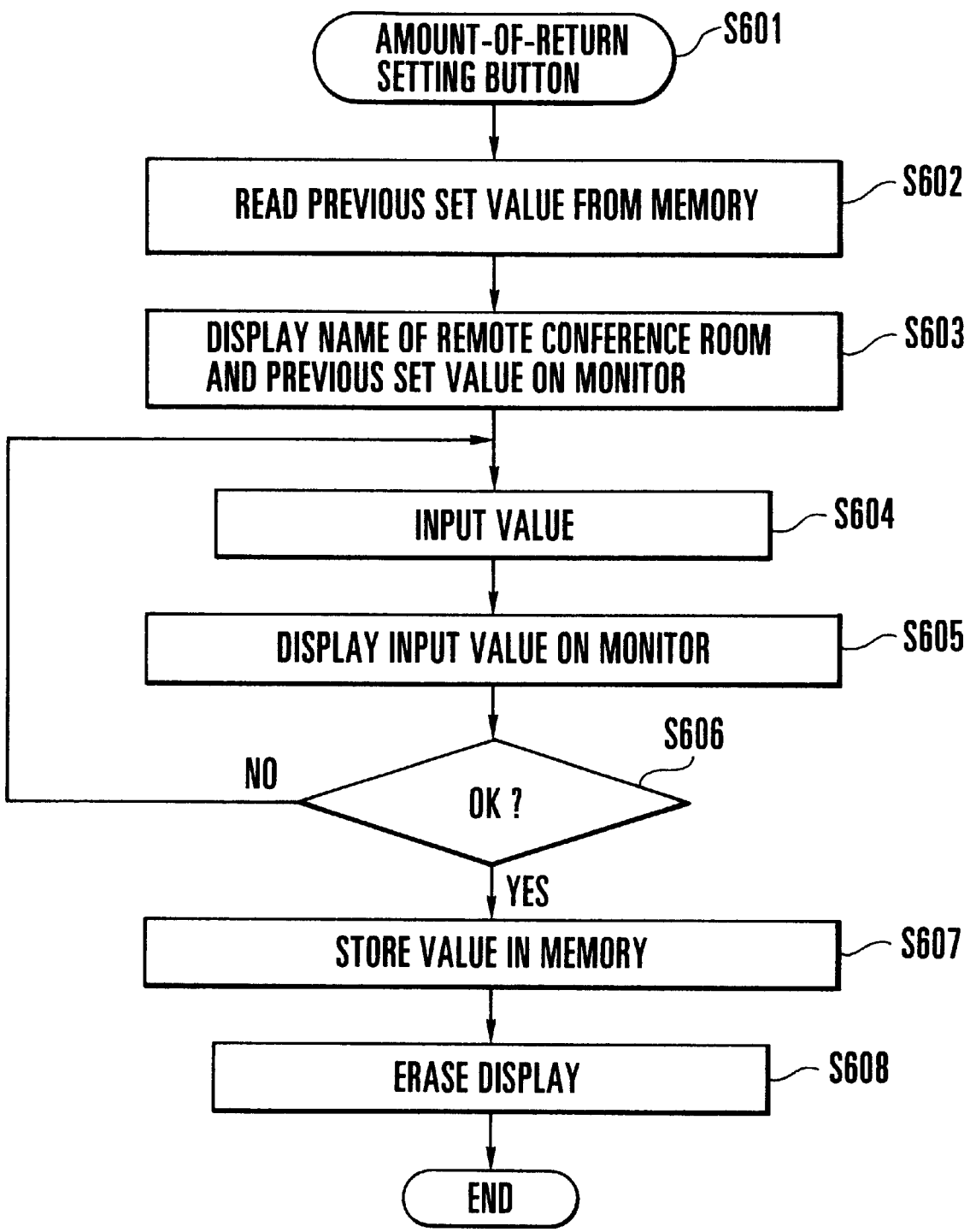
FIG. 13 is a flowchart showing the operation of a third embodiment.

FIG. 13 is a flowchart showing the operation of a third embodiment. The third embodiment is arranged so that the value of the amount of return can be directly inputted from the operating device or the like.

In Step S601, the person "a" presses the amount-of-return button 142 of the operating device 134A. Then, in Step S602, the system control circuit 32A reads a previous set value from the memory. In Step S603, the name of a remote station and the previous set value are display on the monitor device 20A via the image control circuit 22A. In Step S604, the person "a" inputs a new value from the operating device 134A, Then, in Step S605, the new value is displayed on the monitor device 20A. In Step S606, the system control circuit 32A waits for the person "a" to input an instruction, If the person "a" inputs a rewriting instruction, the process returns to Step S604, where a new value is inputted. If the person "a" selects the new value displayed in Step S605, the process proceeds to Step S607, where this value is stored in the memory. In Step S608, the displayed content is erased. In the above-described manner, the correction value (the amount of return) can be rewritten.

As is apparent from the foregoing description, in accordance with the present embodiments, during remote control of the movement of a device provided in a remote station, for example, in the case of the operation of correcting the state in which a camera has moved past a target position, the speed of camera movement is reduced or the amount of camera movement is decreased so that the camera can be prevented from again moving past the target position.

Also, after the movement of the camera in the remote station has been stopped, the camera is controlled to return by a predetermined amount in the direction opposite to the direction in which the camera has moved before it stops. Thus, it is possible to display a desired image at an optimum position on a monitor provided in the present station.

Further, since the amount of return can be written into a memory, if a change occurs in conditions, such as the kind of device to be remote-controlled and the location of a participant in a remote station, and the written value must be modified, it is possible to easily modify the written value.

What is claimed is:

1. A device controlling method for controlling a device at a second point by an operating device at a first point, comprising the steps of:

causing the device prepared at the second point to perform a predetermined movement by a first amount of driving, in response to an instruction of a motion provided from the operating device by an operator at the first point to the device at the second point; and if the instruction is provided from the operating device by the operator at the first point to the device at the second point again within a predetermined time after a predetermined manual operation is finished, causing the device to move by a second amount of driving smaller than the first amount of driving, and if the instruction is provided from the operating device by the operator at the first point to the device at the second point again beyond the predetermined time after the predetermined manual operation is finished, causing the device to move by the first amount of driving.

2. A device controlling method according to claim 1, wherein the device is a camera and the movement is a travel of the camera.

3. A device controlling method according to claim 2, wherein each of the first and second amounts of driving is a speed of movement of the camera.

4. A device controlling method according to claim 2, wherein each of the first and second amounts of driving is an amount of movement of the camera.

5. A device controlling method according to claim 1, wherein, in said step of causing the device to move by the second amount of driving, information indicative of a state in which the device is moved by the second amount of driving is displayed on a monitor.

6. A device controlling method according to claim 1, wherein a setting of the second amount of driving can be varied.

7. A device controlling method according to claim 1, wherein a value of the second amount of driving is automatically selected based upon a location of said second point and the device is controlled in accordance with the value.

8. A system for controlling a terminal device at a second point by an operating device at a first point comprising:

(a) the terminal device prepared at the second point;

(b) the operating device prepared at the first point for instructing said terminal device to perform a movement; and (c) controlling means for causing said terminal device to move by a second amount of driving smaller than a first amount of driving if the instruction is provided from the operating device by an operator at the first point again within a predetermined time after a predetermined manual operation is finished and said controlling means for causing said terminal device to move by the first amount of driving if the instruction is provided from the operating device by the operator at the first point again beyond the predetermined time after said predetermined manual operation is finished.

9. A system according to claim 8, wherein said terminal device is a camera and the movement is a travel of the camera.

10. A system according to claim 8, wherein when said controlling means causes said terminal device to move by the second amount of driving, said controlling means causes a monitor to display information indicative of a state in which said terminal device is moved by the second amount of driving.

11. A system according to claim 8, wherein said controlling means automatically selects a value of the second amount of driving, based upon a location of the second point, and controls said terminal device in accordance with the value.

12. A system according to claim 8, further comprising setting means for varying a setting of the second amount of driving.

* * * * *